United States Patent [19]
Aizawa et al.

[11] 3,766,780
[45] Oct. 23, 1973

[54] TURBINE FLOWMETER WITH BEARING-LUBRICATION DEVICE

[75] Inventors: Kensuke Aizawa, Yokohama; Shigeo Sugiyama, Fujisawa, both of Japan

[73] Assignee: Tokico Ltd., Kawasaki, Kanagawa, Japan

[22] Filed: Mar. 15, 1972

[21] Appl. No.: 234,884

[30] Foreign Application Priority Data
Mar. 20, 1971 Japan.................................. 46/16060

[52] U.S. Cl. ............................... 73/231 R, 308/187
[51] Int. Cl. ............................................. G01f 1/00
[58] Field of Search ................... 73/229, 230, 231 R, 73/231 M, 272; 308/115, 187

[56] References Cited
UNITED STATES PATENTS
| | | | |
|---|---|---|---|
| 3,182,504 | 5/1965 | Rittenhouse et al. ............. | 73/231 R |
| 1,254,054 | 1/1918 | Mayer ................................... | 73/229 |
| 3,248,943 | 5/1966 | Francisco, Jr...................... | 73/231 R |

Primary Examiner—Richard C. Queisser
Assistant Examiner—John P. Beauchamp
Attorney—Eric H. Waters et al.

[57] ABSTRACT

A turbine flowmeter has a lubrication device for supplying lubricating oil from outside of the main body of the flowmeter to bearings rotatably supporting a turbine rotor within the body. The lubricating device has an oil reservoir provided outside of the body and passage means for conducting lubricating oil from the oil reservoir, through a fixed shaft supporting the bearings, and thence to the bearings. The flowmeter further has passage means for transmitting gas pressure within the flowmeter body to a space within the oil reservoir.

5 Claims, 3 Drawing Figures

TURBINE FLOWMETER WITH BEARING-LUBRICATION DEVICE

BACKGROUND OF THE INVENTION

This invention relates to a turbine flowmeter and more particularly to a turbine flowmeter having a lubrication device for supplying lubricating oil to bearings rotatably supporting the rotor of the flowmeter.

Turbine flowmeters are widely used for measuring flow of fluids since, in general, they can be made miniature in size and, moreover, make possible measurements with high accuracy. Particularly with the development of chemical industries in recent years, the use of turbine flowmeters has become a common practice also in measurement of flow of a gas flowing at high flow rate under high pressure. However, when a turbine flowmeter is used for measurement of flow quantity of the gas, the rotational resistance of the rotor supporting the turbine vanes or blades has a great effect on the accuracy. Furthermore, the gas itself does not have a lubricating action.

Accordingly, conventional turbine flowmeters have been provided with ball bearings for journaling the rotor, and measures have been sought to minimize the rotational resistance of the ball bearings themselves. However, if a ball bearing is lubricated with grease which is left therewithin, the rotational resistance thereof increases. As a result, the present state of the art is such that the ball bearings in known turbine flowmeters are being used without any effective measures for lubrication. For this reason, the rotational resistance of the bearings without lubricant in a knonw flowmeter is high, and, moreover, known serviceable life of the flowmeter is short.

SUMMARY OF THE INVENTION

Accordingly, a general object of this invention is to provide a novel and useful turbine flowmeter in which the above described disadvantages are removed.

More specifically, an object of the invention is to provide a turbine flowmeter provided with a lubricating device for effectively supplying a lubricant to the bearings rotatably supporting the rotor carrying turbine blades.

Another object of the invention is to provide a turbine flowmeter capable of effectively measuring the quantity of the gas. In the bearing lubricating device according to the present invention, a difference in the pressures of the gas within the flowmeter is utilized to supply the lubricant effectively and smoothly to the bearings.

Further objects and features of the invention will be apparent from the following detailed description with respect to preferred embodiments thereof when read in conjunction with the accompanying drawings, in which like parts are designated by like reference numerals.

DETAILED DESCRIPTION

Figure 1:
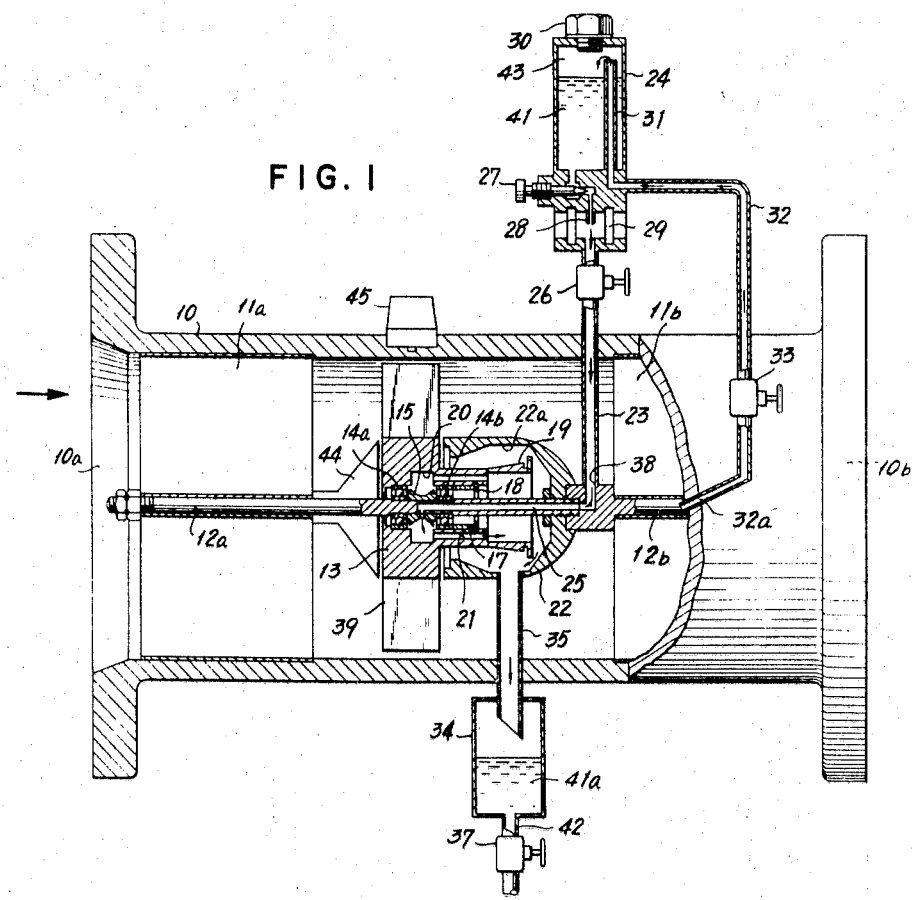
FIG. 1 is a side view, with parts cut away and parts shown in longitudinal section, illustrating one embodiment of a turbine flowmeter having a bearing-lubricating device according to the invention.
Figure 2:
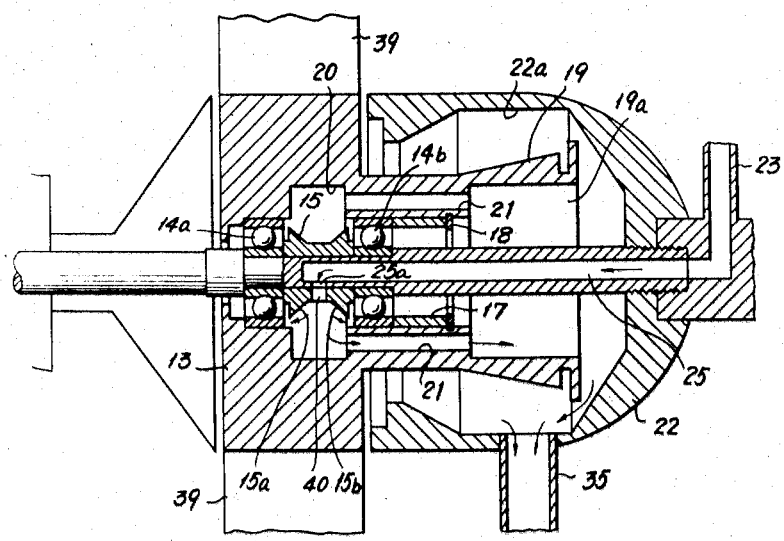
FIG. 2 is an enlarged partial side view, in longitudinal section, showing the ball bearings and neighboring parts of the flowmeter shown in FIG. 1.

In the first embodiment of a turbine flowmeter according to the invention as illustrated in FIGS. 1 and 2, the flowmeter has a hollow cylindrical body structure 10 with a flanged inlet 10a and a flanged outlet 10b for a gas which is the fluid to be measured. Within the cylindrical body 10 and near the inlet 10a and outlet 10b, frames 11a and 11b are respectively fixed to the wall of the body and respectively support fixed shafts 12a and 12b in coaxial disposition relative to the body. The fixed shaft 12a in its downstream (right-hand as viewed in FIG. 1), approximately one-half part is hollow, having a longitudinal passage hole 25 bored therein. The downstream end of the fixed shaft 12a is fixedly coupled to the upstream end of the fixed shaft 12b so as to communicate the passage hole 25 with a passage hole 38 formed in the fixed shaft 12b.

A rotor 13 carrying a plurality of turbine blades 39 imbeddedly fixed thereto is rotatably supported on two ball bearing 14a and 14b with inner races fixed to and around the fixed shaft 12a at its approximately middle part. The rotor 13 has a hollow cylindrical oil slinger 19 formed integrally and coaxially therewith and extending downstream therefrom. The ball bearings 14a and 14b are positioned in a spaced-apart state by a spacer collar 15 fixed to and around the fixed shaft 12a. The fixed or inner races of the ball bearings are fixed to the fixed shaft 12a as mentioned above, while the rotatable or outer races are fixed to the rotor 13. The space collar 15 has therein a through hole 40 communicating with the upstream open end 25a of the aforementioned passage hole 25 bored in the fixed shaft 12a as best indicated in FIG. 2. The spacer collar 15 has an hourglass shape, having a waisted middle part of small diameter and tapered parts 15a and 15b divergently expanding in the upstream and downstream directions. The above mentioned through hole 40 is bored through the waisted middle part of the spacer collar 15.

The outer end of the through hole 40 opens into an annular chamber 20 formed within the rotor 13 between the ball bearings 14a and 14b and between the spacer collar 15 and the inner surface of the rotor. The chamber 20 is communicative with the open end 19a of the above mentioned oil slinger part 19 through oil passage holes 21 formed in the longitudinal direction through a part of the oil slinger 19 radially outside of the ball bearing 14b. The downstream side lateral face of the ball bearing 14b is pressed and held by a collar 17, which in turn is urged thereagainst by a spring washer 18 preventing dislodgement of the collar 17. Adjacently downstream from the rotor 13, there is provided a rear fairing or hollow tail cone 22 disposed coaxially with the rotor and fixedly supported on the fixed shafts 12a and 12b. The upstream end of this tail cone 22 confronts the downstream side face of the rotor 13 with a small gap therebetween. The tail cone 22 is in the form of a streamline fairing fully enclosing the oil-slinger part 19 of the rotor and thereby affords smooth flow of the gas being measured.

An oil reservoir 24 containing a lubricating oil 41 is fixedly supported outside of and above the flowmeter body 10. The lubricating oil 41 in the reservoir 24 drips through a nozzle 28 with a suitable quantity determined by a needle valve 27 provided below the bottom of the reservoir 24. The oil thus dripping from the nozzle 28, which oil is observable from outside of the reservoir 24 through a glass window 29, is introduced into the outer end of a pipe 23 having a valve 26 in an intermediate part thereof and extending into the flowmeter body 10 through its cylindrical wall to communicate with the outer end of the aforementioned passage hole 38 formed in the fixed shaft 12b. An upright pipe 31 for introducing gas pressure is installed within the oil reservoir 24 and has an open upper end disposed near the upper part of the reservoir interior. The lower end of this pipe 31 is connected to the outer end of a pipe 32 which at its other end 32a passes through the wall of the flowmeter body 10 and communicates with the interior thereof. A valve 33 is provided in an intermediate part of this pipe 32. The open orifice of the inner end 32a of this pipe is disposed between the outlet 10b and a position on the body 10 laterally opposite the tail cone 22.

An oil sump tank 34 is fixedly supported outside of and below the flowmeter body 10. A pipe 35 is connected at its upper end to a bottom drain hole in the tail cone 22 and, extending downward and outward through the wall of the flowmeter body 10, is open at its lower end in the interior of the sump tank 34. Discharged oil conducted from the tail cone interior through the pipe 35 collects in the sump tank 34 as described hereinafter. A drain pipe 42 provided with a valve 37 is connected at its upper end to a drain hole in the bottom of the sump tank 34.

In the operation of the turbine flowmeter of the above described construction according to the present invention, the lubricating oil 41 is supplied to the ball bearings 14a and 14b in the following manner.

A gas constituting a fluid to be measured and flowing in a pipe line (not shown), in which the flowmeter body 10 in installed, enters the flowmeter body 10 through the inlet 10a and flows through the body toward the outlet 10b. This gas flow acts on the turbine blades 39 and causes these blades to rotate together with the rotor 13. This rotation of the blades 39 is detected by a pickup 45 for rotation detection installed on the wall of the flowmeter body 10 and operating in cooperation with the blades. The pickup 45 emitts signals in accordance with the flow of the gas whereby the flow quantity of the gas flowing through the flowmeter body is measured. In this operation, the bearing-lubricating device operates in the following manner.

First, the valves 26 and 33 are closed when the reservoir 24 is to be replenished with the lubricating oil 41. A screw plug 30 at the top of the reservoir 24 is then removed, and the lubricating oil 41 is supplied into the reservoir through the inlet thus opened. For the lubricating oil 41, an oil having a viscosity of the order of from 8 to 17 centi-stokes (cSt.) and having good lubricating characteristics is suitable. In the instant embodiment, a spindle oil of a viscosity of 10 cSt. is used. Thereafter, the plug 30 is closed, and the valves 26 and 33 are opened, whereupon the pressure of the flowing gas in the interior of the flowmeter body 10 is transmitted through the pipes 32 and 31 to a space 43 within the oil reservoir 24 and above the lubricating oil 41. Accordingly, the pressure in the space 43 within the oil reservoir 24 becomes equal to the gas pressure within the flowmeter body 10.

The supply of the lubricating oil 41 is adjusted by means of the needle valve 27 to a rate of the order of from one drop per 2 or 3 minutes to one or two drops per minute dripping from the nozzle 28 as observed through the window 29.

The flow path of the gas passing through the flowmeter body 10 is constricted at the combination of a nose cone 44, the rotor 13, and the tail cone 22. Consequently, the velocity of the gas in the vicinity of the turbine blades 39 is relatively high, whereby the gas pressure in the neighborhood of the upstream open end of the tail cone 22 becomes lower than the gas pressure in the vicinity of the open end 32a of the pipe 32 communicating with the interior of the flowmeter body 10. Therefore, a difference develops between the pressure $P_1$ of the gas in the space 43 within the oil reservoir 24 and the pressure $P_2$ of the flowing gas in the vicinity of the upstream open end of the tail cone 22 and the rotor 13. Then, $P_1$ is greater than $P_2$. As a result, the lubricating oil dripping from the nozzle 28 falls through the pipe 23 under the force of gravity and, at the same time, is forced by this gas pressure difference ($P_1-P_2$) to pass smoothly through the pipe 23, the passage holes 38 and 25 to reach the opening 25a.

The oil thus reaching the opening 25a passes out through the hole 40 in the spacer collar 15, one part of this oil falling directly into the chamber 20 through the hole 40, and another part being drawn by the surface tension of the oil to travel along the inclined surfaces of the tapered parts 15a and 15b of the spacer collar 15 to reach the ends thereof. While some of the oil reaching the ends of the collar 15 drops into the chamber 20, most of the oil is drawn by capillary action to enter the gaps between the ends of the collar 15 and the ball bearings 14a and 14b and thereby to enter the interiors of these ball bearings. Furthermore, together with the rotation of the rotor 13, the outer races and balls of the ball bearings also rotate. For this reason, the oil which has infiltrated into the interior of the ball bearings 14a and 14b is distributed uniformly throughout the entire ball bearings.

Thus, a part of the oil flowing out of the hole 40 flows along the conical surfaces of the tapered parts 15a and 15b of the spacer collar 15, and of this part, only a certain quantity is supplied to the ball bearings 14a and 14b. For this reason, supply of oil at a very small suitable rate can be carried out. Furthermore, since the spacer collar 15 is symmetrically formed with the same inclination in the surfaces of its tapered parts 15a and 15b, the oil flowing out of the hole 40 is divided into two equal portions which are respectively distributed to these surfaces, whereby the ball bearings 14a and 14b are supplied with equal quantities of lubricating oil. As a result, the ball bearings 14a and 14b are continually supplied with an appropriate quantity of lubricating oil, whereby the rotor 13 can rotate in a smooth manner with extremely small resistance to rotation.

Surplus oil which as collected in the chamber 20 within the rotor 13 flows through the passage holes 21 and is centrifugally projected into the hollow space 22a within the tail cone 22 from the open end of the oil slinger part 19 of the rotor. Since the open end of the oil slinger part 19 and the open end of the tail cone 22 are directed in mutually opposite directions, and the tail cone 22, moreover, is formed to fully enclose the oil slinger part 19, there is no possibility of the oil slung out from the oil slinger part 19 being scattered out of the tail cone 22. The oil which has moved along the inner wall surface of the hollow space 22a and reached the bottom thereof drains out through the pipe 35 and collects in the sump tank 34. The discharge oil 41a thus collected is discharged to the outside through the drain pipe 42 by periodically opening the valve 37.

Figure 3:
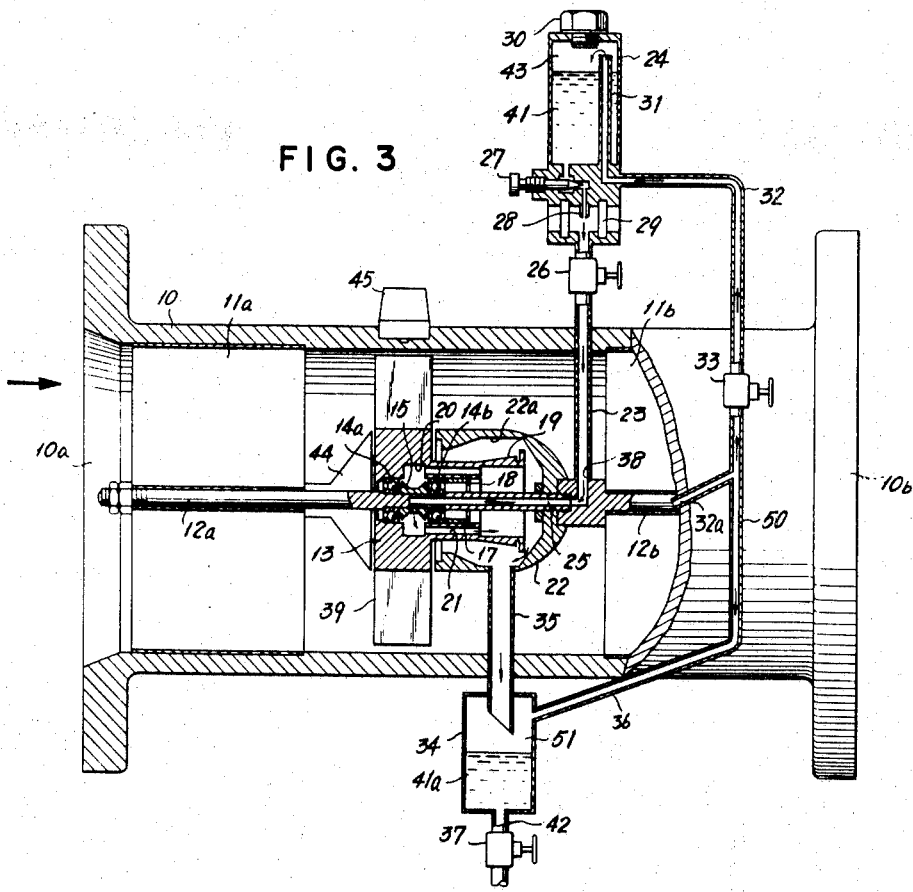
FIG. 3 is a side view, with parts cut away and parts shown in longitudinal section, illustrating another embodiment of a turbine flowmeter having a lubricating device according to the invention.

A second embodiment of the turbine flowmeter according to the invention is illustrated in FIG. 3, in which parts which are the same as or similar to those shown in FIG. 1 are designated by the same reference numerals, and the description thereof will not be repeated.

In general, the force exerted on the blades 39 of the rotor 13 by the gas flowing in the arrow direction from left to right in FIG. 3 includes an axial thrust component which tends to displace the rotor downstream or to the right as viewed in FIG. 3. When this axial thrust component is large, smooth rotation of the rotor 13 is impaired in some cases. In the instant embodiment, supplying of lubricating oil to ball bearings is carried out similarly as in the above described first embodiment, but, at the same time, means are provided to prevent displacement of the rotor 13 as described below.

The upper end of a pipe 50 is communicatively connected to the aforedescribed pipe 32 having the open end 32a and communicates with a space 51 within the sump tank 34 above the discharge oil 41a. Accordingly, the normal gas pressure within the flowmeter body 10 is transmitted by way of the open end 32a and the pipe 50 to the space 51 within the sump tank 34. The pressure within the space 51 is transmitted by way of the pipe 35 and the hollow space 22a to the open end of the tail cone 22 confronting the rotor 13. The diameter of the pipe 50 and other related dimensions are so designed that the relationship between the gas pressure $P_3$ at the open end of the tail cone 22 and the aforementioned gas pressures $P_1$ and $P_2$ will be $P_1 > P_3 > P_2$.

The introduction of the gas pressure within the space 51 to the open end of the tail cone 22 as described above imparts an axial thrust on the rotor 13 tending to displace it upstream or toward the left as viewed in FIG. 3. This axial thrust nullifies the aforedescribed axial thrust component on the rotor 13 due to the gas flow past the blades 39. As a net result, the rotor 13 is not subjected to any axial displacement force and, therefore, rotates smoothly. In this second embodiment, the difference between the gas pressure in the space 43 within the reservoir 24 and the gas pressure within the hollow space 22a is less than that in the aforedescribed first embodiment, but it has been found that this smaller pressure difference has no deleterious effect whatsoever on the smooth supply of lubricating oil as described above.

Further, this invention is not limited to these embodiments but various variations and modifications may be made without departing from the scope and spirit of the invention.

We claim:

1. A turbine flowmeter having a bearing-lubricating device, comprising: a flowmeter body having an interior with a centerline axis through which a fluid to be measured flows; a fixed shaft fixed to said body on said axis thereof; a rotor having blades and driven in rotation by said fluid; a bearing means fr rotatably supporting said rotor on and around said fixed shaft within said body; a measuring means for extracting a flow quantity signal in accordance with said rotation of the rotor; an oil reservoir provided outside of said body and functioning to store lubricating oil; an oil-supplying means for supplying lubricating oil at an appropriate flow-rate from the reservoir to said bearing means to lubricate the same; and a discharge means for discharging out of said body lubricating oil which has completed lubrication of the bearing means, said oil-supplying means comprising a passage hole formed through a part of the fixed shaft and having an outlet opening in the vicinity of the bearing means and a pipe communicating with the oil reservoir and said passage hole and operating to conduct lubricating oil from the oil reservoir to the passage hole, said bearing means comprising a pair of mutually spaced-apart bearings, and said oil-supplying means further comprising a spacer member fixed to the fixed shaft between said pair of bearings to determine the spacing therebetween and having a shape such as to transfer lubricating oil leaving said outlet opening of the passage hole to the pair of bearings along an outer surface of said spacer member.

2. The turbine flowmeter as set forth in claim 1, in which said spacer member has, at a middle lower part thereof, a through hole communicating said outlet opening of the passage hole with the outside of the spacer member and tapered surfaces inclined from said through hole toward two ends of the spacer member and functioning to conduct lubricating oil from said through hole to said two ends, whereby said lubricating oil enters gaps between said two ends and said bearings respectively adjacent thereto and thereby to be caused by capillary action to enter into the interiors of the bearings.

3. A turbine flowmeter having a bearing-lubricating device, comprising: a flowmeter body having an interior with a centerline axis through which a fluid to be measured flows; a fixed shaft fixed to said body on said axis thereof; a rotor having blades and driven in rotation by said fluid; a bearing means for rotatably supporting said rotor on and around said fixed shaft within said body; a measuring means for extracting a flow quantity signal in accordance with said rotation of the rotor; an oil reservoir provided outside of said body and functioning to store lubricating oil; an oil-supplying means for supplying lubricating oil at an appropriate flow-rate from the reservoir to said bearing means to lubricate the same; and a discharge means for discharging out of said body lubricating oil which has completed lubrication of the bearing means, said discharge means comprising an oil slinger member having an approximately hollow cylindrical shape with an open end and operating to direct the lubricating oil supplied to the bearing means toward the discharging direction, a tail cone encasing in a hollow space therewithin the oil slinger member and having an open end facing the upstream direction of the fluid to confront the rotor with a small gap therebetween, an oil discharging pipe extending through the flowmeter body to conduct oil within the tail cone to a point outside of said body, and an oil sump tank for storing discharge oil thus conducted by the oil discharge pipe.

4. The turbine flowmeter as set forth in claim 3 which further comprises a gas pressure transmitting pipe communicatively connecting the interior of the flowmeter body to a space within the oil reservoir above the lubricating oil stored therein, said fluid to be measured being a gas, and said pipe operates to transmit the pressure of said gas within said body to said space within the reservoir, whereby said lubricating oil within the reservoir is acted upon by a force due to the difference between the gas pressure in the space within the reservoir and the gas pressure in said hollow space within the tail cone which is approximately equal to the pressure of the gas flowing at a relatively high speed in the vicinity of the rotor and is thereby supplied by said oil supplying means.

5. The turbine flowmeter as set forth in claim 3 which further comprises a first gas pressure transmitting pipe communicatively connecting the interior of the flowmeter body to a space within the oil reservoir above the lubricating oil stored therein and a second gas pressure transmitting pipe communicatively connecting the interior of the flowmeter body to a space within said sump tank above the discharge oil therewithin, said fluid to be measured being a gas, and said first and second gas pressure transmitting pipes operate to transmit the gas pressure within the flowmeter body to said spaces within the oil reservoir and sump tank, respectively.

* * * * *